Jan. 10, 1956     H. JUFFA     2,729,977
CAPILLARY TUBE FOR MEASURING INSTRUMENTS
Filed Jan. 31, 1952

Inventor:
Hans Juffa
by Armand E. Western
Attorney

United States Patent Office 2,729,977
Patented Jan. 10, 1956

2,729,977

CAPILLARY TUBE FOR MEASURING INSTRUMENTS

Hans Juffa, Kassel, Germany

Application January 31, 1952, Serial No. 269,184

3 Claims. (Cl. 73—371)

The present invention relates to a capillary tube for measuring instruments such as thermometers, time measuring instruments provided with a capillary tube through which a liquid flows, and the like.

Capillaries, as conventionally used, have the disadvantage that liquids often do not flow freely through them even when both ends are open. If both ends are closed, the liquid does not move at all when the tube is in perpendicular position.

It is the object of the present invention to overcome the above-mentioned drawback and to provide a capillary tube in which a liquid will flow comparatively easily in the mounted capillary tube.

According to the invention, free flow of a liquid within a capillary tube is brought about by making the tube with a cross-section that provides for interruptions in the liquid level at the periphery thereof. This may be done by designing a capillary which has in its circumference one or more longitudinally extending projections directed toward the center or one or more grooves, respectively.

Capillaries of the above-mentioned designs permit a liquid to flow freely even though the capillary tubes are closed at both ends. A tube of this kind is of great advantage, for instance, for thermometers. If the liquid thread filling the tube has been disrupted, as may be the case during transportation, it will rearrange itself automatically in an uninterrupted thread when the thermometer is at rest, without tapping or shaking being necessary.

Measuring clocks comprising a capillary tube through which a liquid flows and similar apparatus can be also advantageously equipped with capillary tubes as described and precision measurements are possible with such devices over extended experimental periods.

In the accompanying drawing, two embodiments of the capillary tube according to the invention are illustrated by way of example; it should, however, be understood that a number of variations in the design of the capillary tube can be made without departing from the spirit of the present invention.

Figure 1:
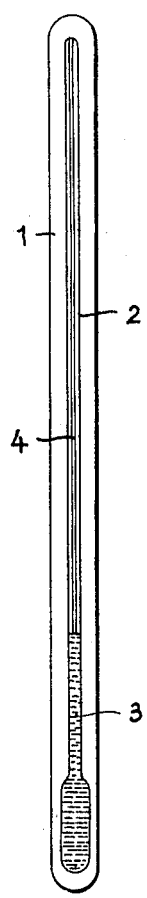
Fig. 1 shows a capillary tube according to the invention in elevation, mounted in a thermometer.

Referring to the drawings:

Fig. 1 shows a thermometer 1 with a capillary tube 2 having as usual an enlarged bulb at one end; the tube is partly filled with a liquid 3.

Figure 2:
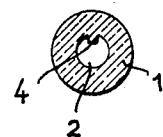
Figs. 2 and 3 show, on an enlarged scale, two embodiments of the capillary tube in cross-section.

As shown in Fig. 2, the capillary tube has a longitudinally extending projection 4.

Figure 3:
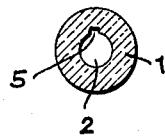

In the other embodiment of the invention, illustrated in Fig. 3, there is a longitudinal groove provided in the cross-section of the capillary tube. The invention also comprises capillary tubes with a plurality of projections or grooves instead of the single one shown in the illustrated examples. It can thus be seen that in both Figs. 2 and 3 the tube is substantially circular in cross section and has an interruption which extends along the periphery of the tube wall. Whether the interruption is a groove or projection it includes a pair of substantially parallel walls extending approximately perpendicularly to said bore and a transverse wall extending between the pair of parallel walls.

Figure 4:
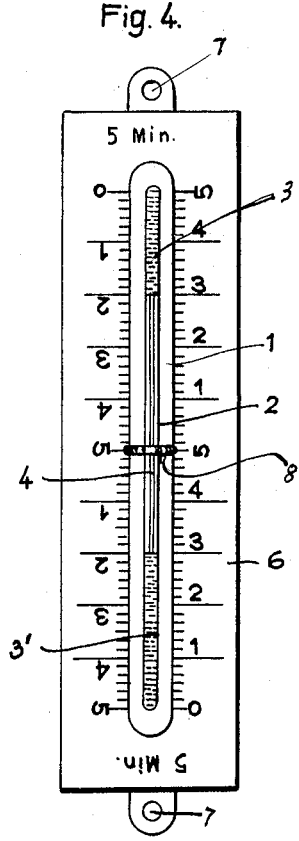
Fig. 4 illustrates the capillary tube mounted in a measuring clock for liquids.

The measuring clock, according to Fig. 4, has a tube 1 mounted on a wall board 6 by means of a clamp 8. The capillary tube is again designated by 2, the liquid by 3. The board 6 may be attached to the wall by lugs 7.

The wall board is provided with a scale ranging from 1–5 at each side of the center, in order to show the level of the liquid on top and at the bottom respectively, after the lapse of a certain time. Thus, in the example shown in Fig. 4, the amount of liquid 3′ at the bottom of the tube has flown down from the top in three minutes.

For precision measurements, it is essential that the measuring clock according to the invention is provided with a scale, that is convenient both in its length and in the range of liquid passage. The design of such a measuring clock, the arrangement of the capillary tube thereon, the length of the tube, may all be subject to variations as necessary. It should also be understood that the cross-sectional showings of a capillary tube in Figs. 2 and 3 are only illustrative and not limiting.

Tubes according to the invention may be made of glass or other appropriate material and may be used instead of the conventional capillaries with circular cross-section, whether the capillaries be open or closed, wherever it appears desirable to have a free flow of liquid.

By "liquid" in the specification and claims I understand certain colored liquids, such as alcohol, gasoline, pentane, toluene, and the like, as contradistinguished from mercury.

What I claim is:

1. A capillary device comprising a capillary tube having a bore of substantially circular cross section, said tube having at least one interruption in said circular cross section extending longitudinally along the wall of the bore integrally therewith at the periphery thereof, said interruption having a pair of substantially parallel walls extending approximately perpendicularly to said bore and a transverse wall extending between said pair of parallel walls, and a column of a liquid movable through said capillary tube.

2. A capillary device comprising a capillary tube having a bore of substantially circular cross section, said tube having at least one projection extending longitudinally along the wall of said bore integrally therewith at the periphery thereof, said projection having a pair of substantially parallel walls extending substantially perpendicularly to said bore and a transverse wall extending between said pair of parallel walls, and a column of a liquid movable through said capillary tube.

3. A capillary device comprising a capillary tube having a bore of substantially circular cross section, said tube having at least one groove extending longitudinally along the wall of said bore integrally therewith at the periphery thereof, said groove having a pair of substantially parallel walls extending substantially perpendicularly to said bore and a transverse wall extending between said pair of parallel walls, and a column of a liquid movable through said capillary tube.

References Cited in the file of this patent

UNITED STATES PATENTS

| 2,250,784 | Tauscher | July 29, 1941 |
| 2,519,853 | Rossell | Aug. 22, 1950 |

FOREIGN PATENTS

| 636,812 | Germany | Oct. 15, 1936 |
| 467,060 | Great Britain | June 10, 1937 |
| 926,403 | France | Apr. 14, 1947 |